United States Patent [19]
Boele

[11] Patent Number: 5,837,138
[45] Date of Patent: Nov. 17, 1998

[54] FILTER DEVICE

[75] Inventor: Hendrik Arie Boele, Dussen, Netherlands

[73] Assignee: Rowe Parsons International Inc., Switzerland

[21] Appl. No.: 411,793

[22] PCT Filed: Oct. 7, 1993

[86] PCT No.: PCT/NL93/00198

§ 371 Date: May 26, 1995

§ 102(e) Date: May 26, 1995

[87] PCT Pub. No.: WO94/07586

PCT Pub. Date: Apr. 14, 1994

[30] Foreign Application Priority Data

Oct. 7, 1992 [NL] Netherlands ............................ 9201731

[51] Int. Cl.⁶ .................................................. B01D 33/067
[52] U.S. Cl. ................... 210/237; 210/360.1; 210/380.1; 210/380.3; 210/398; 210/402; 210/403
[58] Field of Search ............... 210/380.1, 380.2, 210/398, 484, 485, 232, 237, 360.1, 380.3, 402, 403

[56] References Cited

U.S. PATENT DOCUMENTS 2,956,683 10/1960 Kinney et al. ........................... 210/411
5,149,432 9/1992 Lavin ..................................... 210/380.1
5,460,717 10/1995 Grimwood et al. ................. 210/380.1

FOREIGN PATENT DOCUMENTS

| 2567038 | 1/1986 | France . |
| 371572 | 4/1932 | Netherlands . |
| 288719 | 6/1953 | Sweden . |
| 288719 | 2/1953 | Switzerland . |
| 897315 | 5/1962 | United Kingdom . |
| 1024198 | 3/1966 | United Kingdom . |

*Primary Examiner*—Robert Popovics
*Attorney, Agent, or Firm*—Webb Ziesenheim Bruening Logsdon Orkin & Hanson, P.C.

[57] ABSTRACT

A device for separating a component from a fluid includes a closed carrier drum having a fluid inlet and a fluid outlet. A filter element is positioned in the carrier drum. The filter element has a top face and a bottom face and a cylindrical wall extending therebetween. A fluid duct is positioned between the top and bottom faces of the filter element along a longitudinal axis of the filter element. The longitudinal axis of the filter element is positioned coaxially with the longitudinal axis of the carrier drum. The filter element and the carrier drum are rotatable about their coaxially positioned longitudinal axes.

7 Claims, 7 Drawing Sheets

5,837,138

FILTER DEVICE

BACKGROUND OF THE INVENTION

1. Field of the Invention

The invention relates to a device for separating one or more components from a fluid such as gas, water, oil and so on, which device is provided with a closed drum-like carrier driven rotatably on an axis and having means for feeding and discharging the fluid.

2. Description of the Prior Art

It is known for separation of components from a fluid to set the fluid into rotation, whereby as a result of the centrifugal force the components will separate from the fluid in layers round the axis of rotation, whereafter discharge thereof becomes possible and whereby the fluid can for instance be cleaned. Conceivable here is the cleaning of flue gases, waste water, contaminated oils and the like, The drawback to such a system is that it is hardly suitable for removing solids from a fluid and that separation can take a long time when there are small differences in specific weight.

It is also known to have filtration take place via a turning drum, the so-called filter centrifuge. Herein the outer wall of the drum is wholly or partially replaced by a filter material. Due to the centrifugal force the mixture for filtering is pressed through the filter material. The material for filtering out is stored on the filter material and there forms a filter cake. The drawback to such a system is that after a shorter or longer time the filter cake clogs the filter material so that further through-flow becomes impossible. Embodiments are known wherein the filter cake is removed with a mechanical scraping device.

SUMMARY OF THE INVENTION

The invention has for its object to obviate the above stated drawbacks and to provide a device wherein the function of centrifugal separation of two or more fractions and the filtering of solid portions out of a medium are combined in one machine. The device according to the invention is distinguished in that one or more filter elements are arranged in the carrier, wherein each filter element has a fluid duct extending between the rotational axis and drum wall.

When the mixture for separating is carried into the turning drum it will be moved by the centrifugal force to the outer wall. Before leaving the drum again via the filters, a part of the heavier fraction will deposit on the drum wall and there form a cake. The mixture, with therein a much smaller proportion of the heavier fraction, will leave the drum via the filter elements under influence of the pressure resulting from the centrifugal force.

It is noted that in known filter systems for filtering contaminated fluid the filters become clogged rather quickly and have to be replaced. In the proposed embodiment the most contaminated portions of the fluid lie as far as possible from the rotation centre, whereby the filter will first be filled with sludge in the part located as far as possible from the rotational axis, but whereby the filtering action will begin to take place more towards the centre of rotation. The filter elements therefore need replacing less quickly.

In a first embodiment the invention proposes to cause the fluid duct in the filter to debouch in the drum wall. As a result of the rotating action, transport of the cleaned fluid through the filter takes place automatically.

In a second embodiment the invention proposes to cause the filter duct to debouch in a central drain duct arranged in the rotational axis. The advantage is here achieved that, although a pressure transport will be necessary to carry the fluid through the duct, the filter elements themselves will be less loaded by pressure differences. In the preferred embodiment use is made of a cylindrical filter element, of which the centrally located fluid duct extends radially in relation to the rotational axis. Such a disposition provides the advantage of being able to use known filter elements and filtering technique in a new application without the drawbacks of normal filtering.

Finally, the invention proposes to place the rotational axis vertically in order to hold imbalance of the drum and contents to a minimum and wherein the filtrate can collect on the bottom of the rotating drum and whereby cleaning of the drum is considerably simplified.

BRIEF DESCRIPTION OF THE DRAWINGS

Above mentioned and ocher features of the invention will be further elucidated in the figure description hereinbelow of a number of embodiments. In the drawing.

DESCRIPTION OF THE PREFERRED EMBODIMENTS

Figure 1:
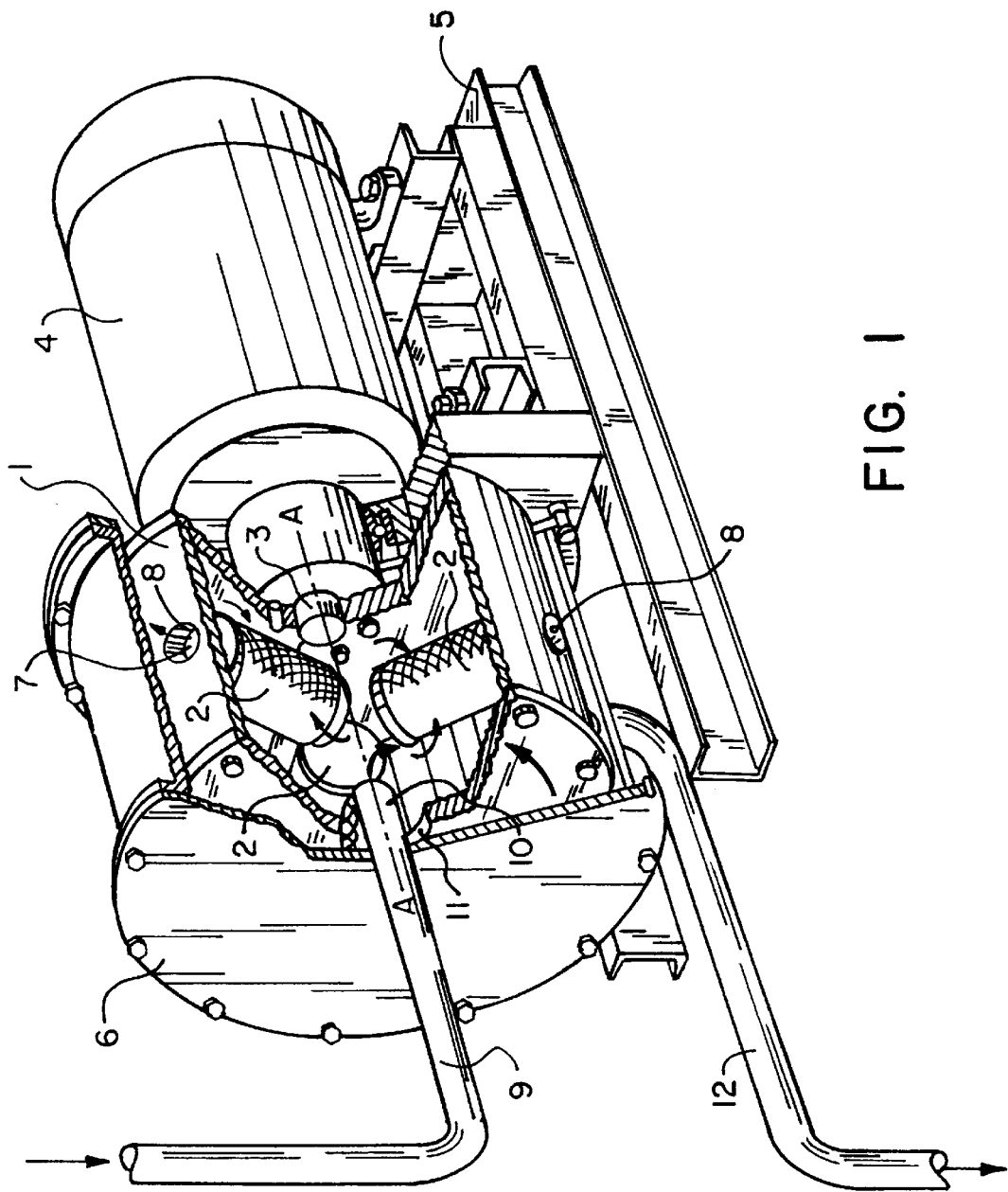
FIG. 1 shows a perspective view, partly with broken away portions, of a first embodiment of the device according to the invention, FIGS. 2a and b show respectively a top and side view of a second embodiment with, in contrast to the embodiment of FIG. 1, a vertical rotational axis, FIGS. 3a and b show respectively a top view and a standing section of a third embodiment of the device according to the invention with the central outlet of the filter elements.

Designated in the figures with the numeral 1 is the drum-like carrier which can rotate around the horizontal axis A—A in FIG. 1 and B—B in the other figures.

Arranged in the rotating drum are filter elements 2 whereof the further details are elucidated per FIG. hereinbelow.

In FIG. 1 the rotating drum 1 is fixed to the output shaft 3 of an electric motor 4 which is mounted on a support frame 5. The drum is held in a stationary container 6 which is likewise supported on frame 5.

Each filter element 2 is of cylindrical form in the embodiment shown in FIG. 1, wherein the cylinder outer surface is embodied in any suitable filter material, for instance metal gauze or paper and so on. Each filter element 2 has a fluid duct 7 which debauches at 8 into the outer surface of drum 1.

The feed of the fluid for cleaning takes place in the embodiment shown in FIG. 1 via a central pipe 9 which debouches in the centre of the rotating drum 1, for which purpose the drum 1 is embodied on the end wall remote from motor 4 with a continuous hole 11.

The drain of the fluid takes place by means of a pipe 12 which is connected to the bottom portion of the outer surface of container 6.

The device of FIG. 1 operates as follows. By causing the drum 1 to rotate by means of motor 4, after supplying of the contaminated fluid via pipe 9, the fluid with contaminated components therein will be flung outward into the drum 1. As a result of the centrifugal action a separation will take place of heavier and lighter portions in the fluid, wherein as a result of the pressure on the outer wall of each filter element 2 the fluid is urged to flow through the filter outer surface toward the fluid duct 7, whereafter the fluid is drained through that duct in the direction of the debouchment 8 and into the container 6 as a result of the centrifugal force. The cleaned fluid is then drained via pipe 12.

In the embodiment shown in FIG. 1 the contaminant components will remain behind in drum 1 and deposit against the inner wall of the outer surface thereof. After a time this will have to be cleaned. The filter material of filter elements 2 will gradually clog up from the drum outer surface 1 toward the inside but the filtering action of the elements continues as long as the deposit has not extended over the full length of the filter elements 2.

Figure 2A:
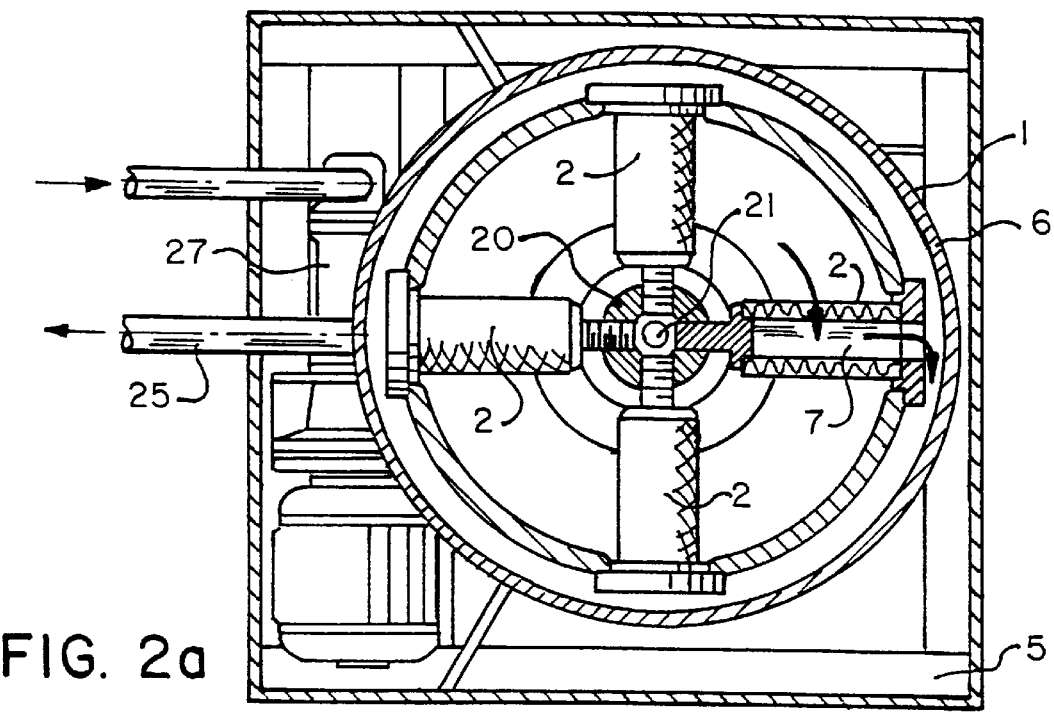
Figure 2B:
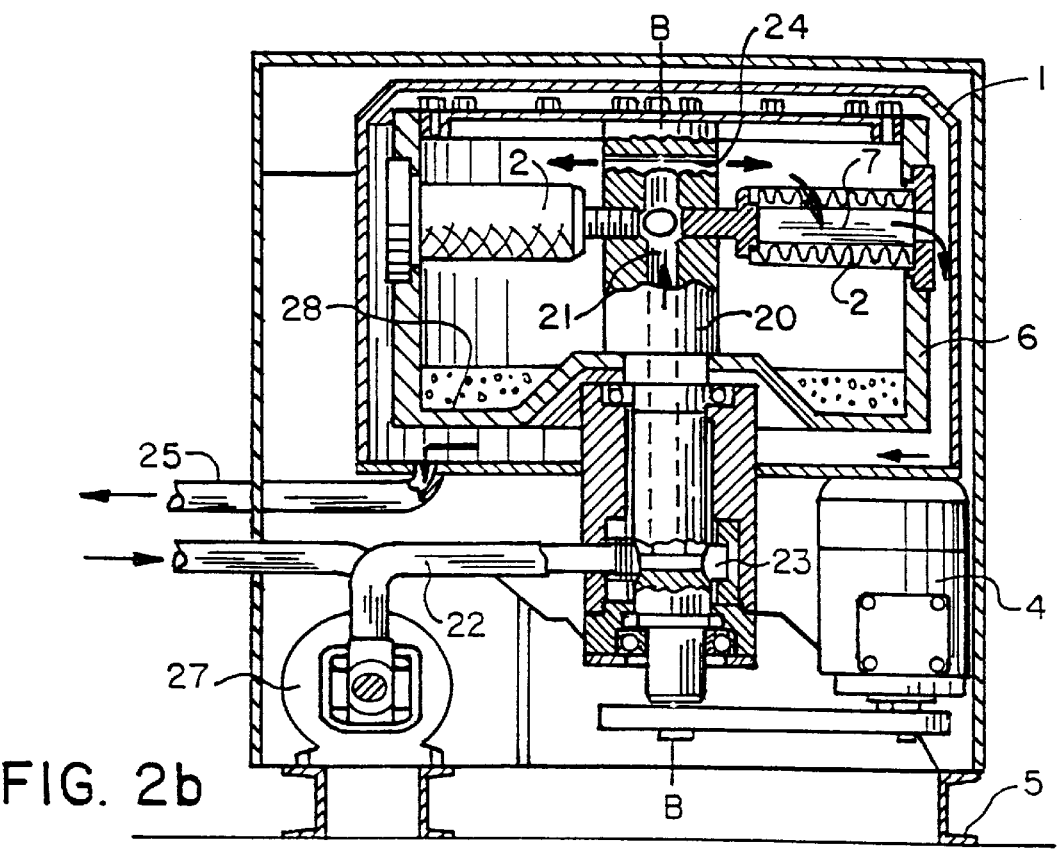

FIG. 2 shows an embodiment wherein drum 1 can rotate round a vertical axis B—B, for which purpose drum 1 is fixed round a vertical shaft 20. The latter is embodied with an axial duct which communicates on one side with the feed pipe 22 for the fluid for cleaning via a liquid chamber 23 received in the mounting of the shaft. On the other side the axial duct 21 communicates with the inner space of drum 1 via a radial duct 24.

Extending once again between the axis of rotation B—B and the outer surface of drum 1 is a number of filter elements 2, in FIG. 2 tour, which are disposed radially.

Drum 1 is once again held in a standing container 6, into the bottom wall of which connects a drain duct 25. A motor 4 sets shaft 20 and drum 1 into rotation via a belt transmission 26.

The operation of the embodiment of FIG. 2 is as follows. By feeding contaminated fluid via the feed pipe 22 by means of for instance a pump 27, this contaminated fluid can enter drum 1 via the axial duct 21 and the radial duct 24. When shaft 20 and drum 1 are made to rotate the fluid will displace outward in the direction of the drum wall of drum 1 where a separation will take place between the heavy and less heavy portions of the fluid. The fluid can flow via the filter elements 2 to the fluid duct 7 arranged therein and is flung outward into container 6 by the centrifugal force. The cleaned fluid can be drained via a pipe 25. The contaminated components of the fluid remain behind in drum 1 and collect against the inner wall of the drum and on the indented bottom 28 of the drum which can be cleaned after a time. The advantage of the vertical rotational axis is that the influence of the stored substances in the drum on the balance of drum plus contents is minimal and that the components can collect far from the filter elements 2, whereby the filter elements become less quickly clogged.

Figure 3A:
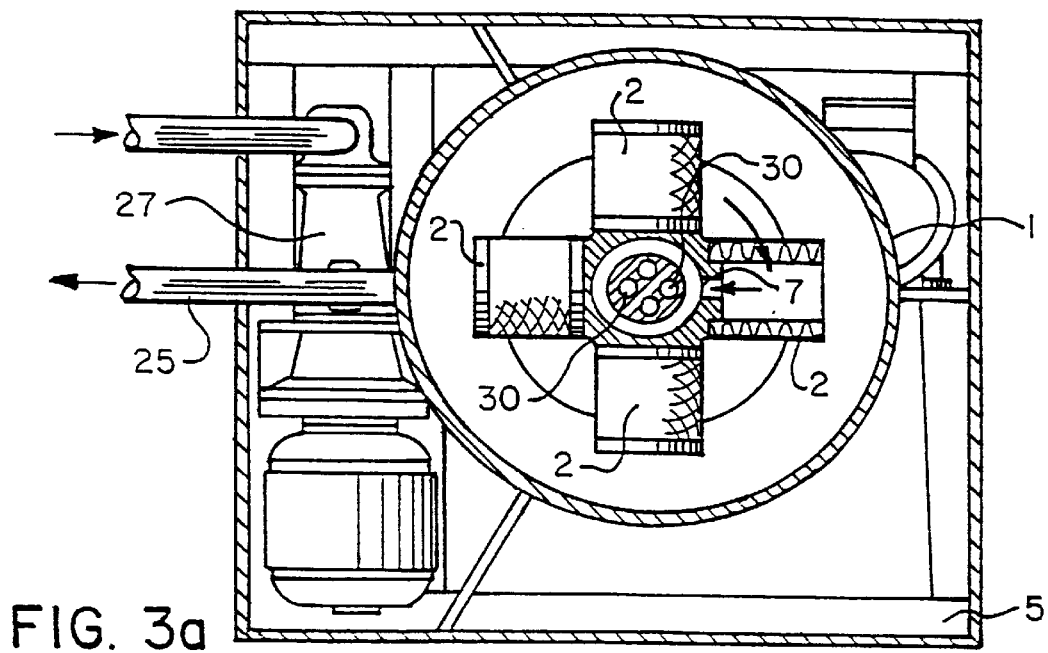
Figure 3B:
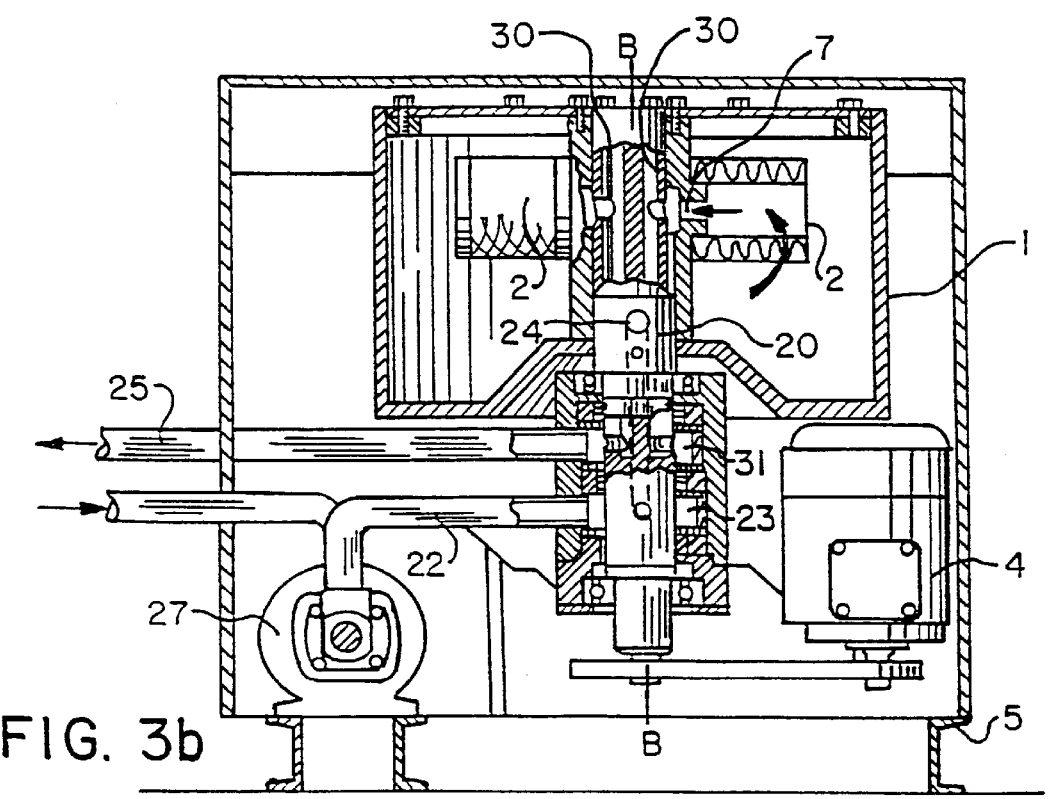

The embodiment of FIG. 3 is likewise embodied with a drum 1 turning on a vertical shaft 20.

The feed of the contaminated fluid also takes place along the feed pipe 22, the fluid chamber 23 in the mounting of shaft 20 and a radial opening 24.

The filter elements 2 are not however arranged between the drum wall of drum 1 and the rotating shaft 20 but are directly fixed onto the rotating shaft 20, wherein the fluid duct 7 of filter element 2 communicates with a second axially oriented duct 30 in shaft 20. Two of these are arranged parallel and adjacently in the shaft and both debauch into a fluid duct 31 in the mounting of shaft 20. This chamber 30 is in communication with the discharge pipe 25.

The advantage of this device is that static pressure on the fluid is the same inside and outside the filter element so that the filter element is not loaded by great pressure differences as a result of the rotation speed. The cleaned fluid will however have to carried to the central duct 30 under the influence of an increased pressure in drum 1 in order to obtain the desired through-flow.

Figure 4:
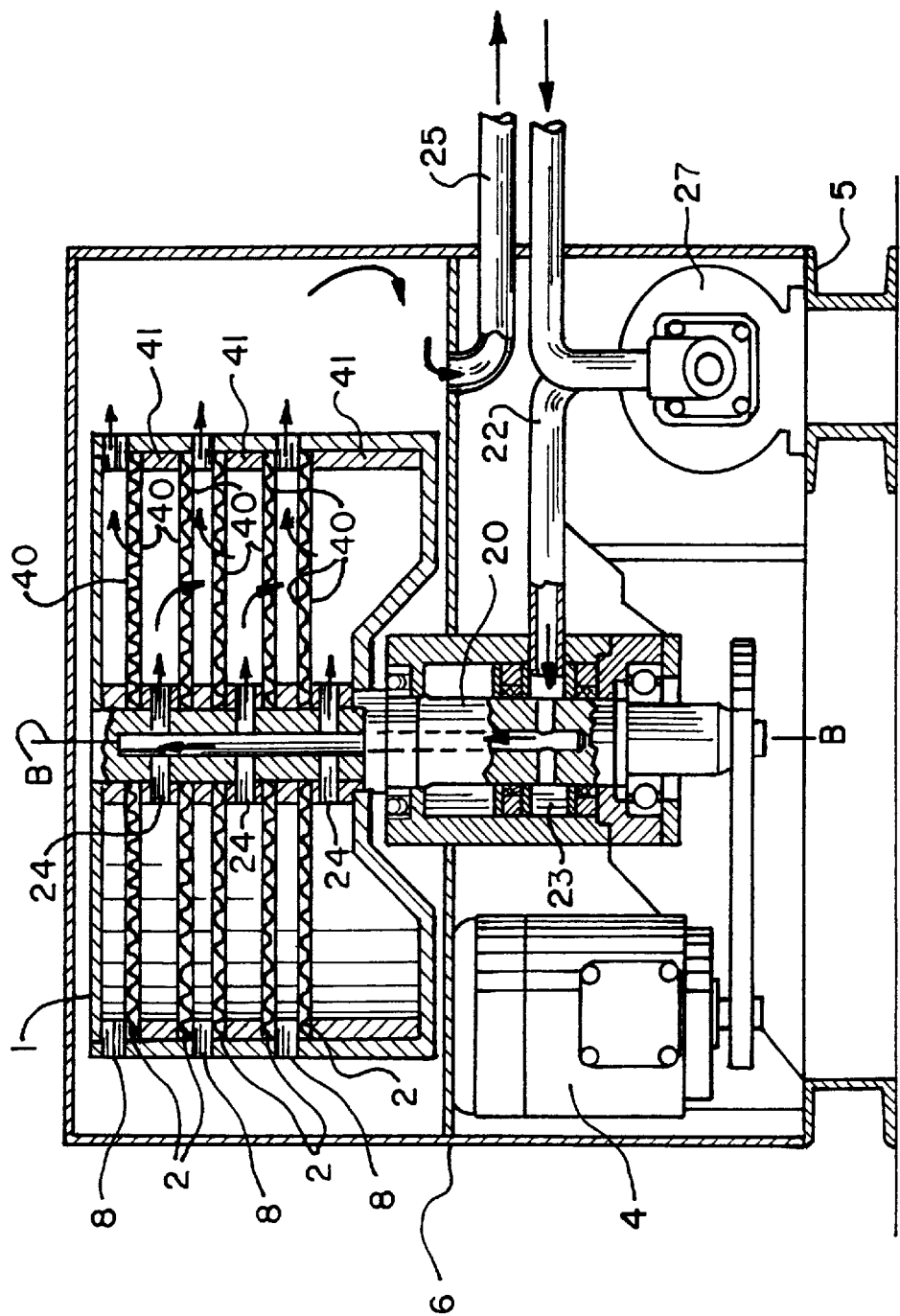
FIG. 4 shows a standing section of a fourth embodiment, wherein filter elements are arranged one above another at a plurality of levels.

The embodiment according to FIG. 4 shows a drum 1 which takes a higher form than those of the preceding figures. Arranged at different levels are a number of filter elements 2, wherein it is conceivable to embody the filter elements 2 in the form of discs. Herein the top and bottom wall of each filter element 2 is made in the form of a disc, wherein the space between the discs 40 communicates via outlet openings 8 with the container 6. The drum-like carrier 1 is herein constructed from rings 41 which connect onto the disc-shaped filter plates, so that the assembled whole forms a closed drum.

The feed of contaminated fluid can take place in the manner as described with reference to an embodiment in FIG. 2, while discharge out of container 6 takes place via discharge pipe 25.

Figure 5:
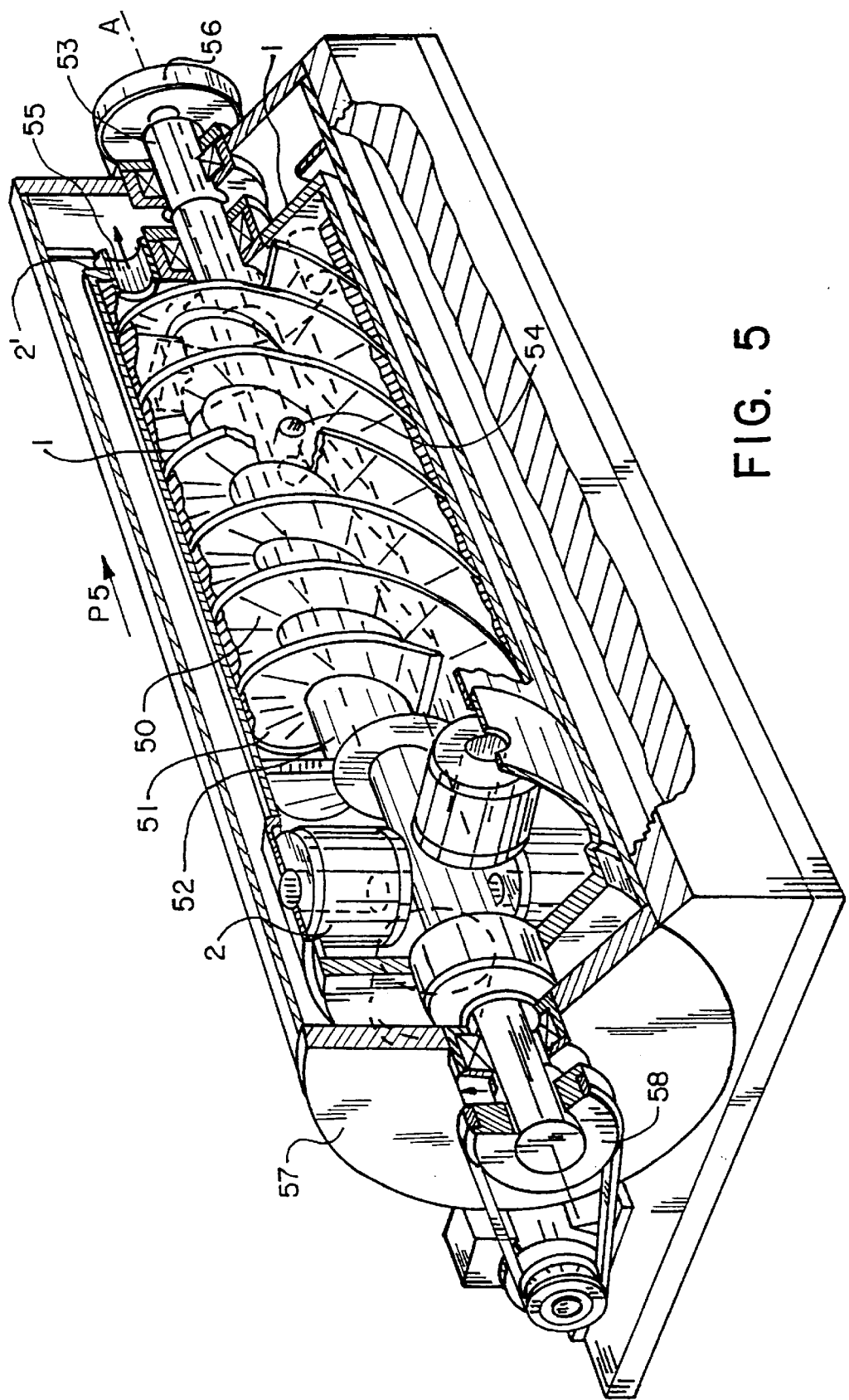
FIG. 5 is a perspective view, partly in section, of a fifth embodiment, wherein the device according to the invention is provided with a scraper member.

FIG. 5 shows a device wherein the rotating drum 1 is lengthened in axial sense. The axis of rotation A—A is here horizontal. Arranged in the drum in the above described manner are four filter elements 2 which are mounted in accordance with the embodiment of FIG. 1. In the lengthened part of the drum is mounted a scraper member 50, here taking the form of a two-thread helix. For this purpose a blade 51 is arranged helically round a central shaft 52, wherein the outer periphery of the blade 51 adjoins the inner surface of the drum 1.

A supply duct 53 for the fluid for cleaning is arranged in shaft 52, which supply duct communicates via the opening 54 with the internal space of drum 1.

On the side of the helical scraper member remote from the filters one or more outlet openings 55 is provided in the end wall 2' of the drum for discharge of the sludge.

The central shaft 52 is driven by a drive 56 of random type, whereby the scraper member 50 can be rotated round the axis A—A.

A drive 58 for driving the drum 1 is arranged on the front side of the housing 57 enclosing the drum 1.

The rotation speeds of the scraper member respectively the drum can be the same or differing depending on the chosen drive. The form of drive, shown here as belt drive, can take any suitable form and otherwise falls outside the scope of the invention.

The operation of the above described embodiment is as follows:

By feeding the contaminated fluid into duct 53 it will enter via opening 54 the space of the drum 1. Due to the rotating action of the drum with scraper member arranged therein the contaminants in the fluid will be flung outward and collect against the inner wall of drum 1. The liquid will herein follow a helical path formed by the blades 51 of the scraper member. This lengthens the path from the opening 54 to the filters 2, whereby a large part of the contaminants are already deposited against the wall of drum 1. With this embodiment less contaminated fluid will therefore reach the filters 2, which increases the standing time of filters 2. By bringing about a relative movement between drum 1 and scraper member 50, due to the different rotation speeds, that is, the helix will move more slowly than the drum, the sludge deposited on the inside of the drum is simultaneously carried rearward in the direction of arrow P5, wherein it accumulates in the compartment portion to the right of the helix where this sludge can be discharged via opening 55.

A continuous process is possible with this embodiment.

Although a filter arrangement in accordance with FIG. 1 is shown, it will be apparent that within the scope of the invention filters can be used in a different arrangement, for instance those according to FIGS. 2–4.

It is finally noted that the axis of rotation A—A can also be set vertically in FIG. 5.

Figure 6:
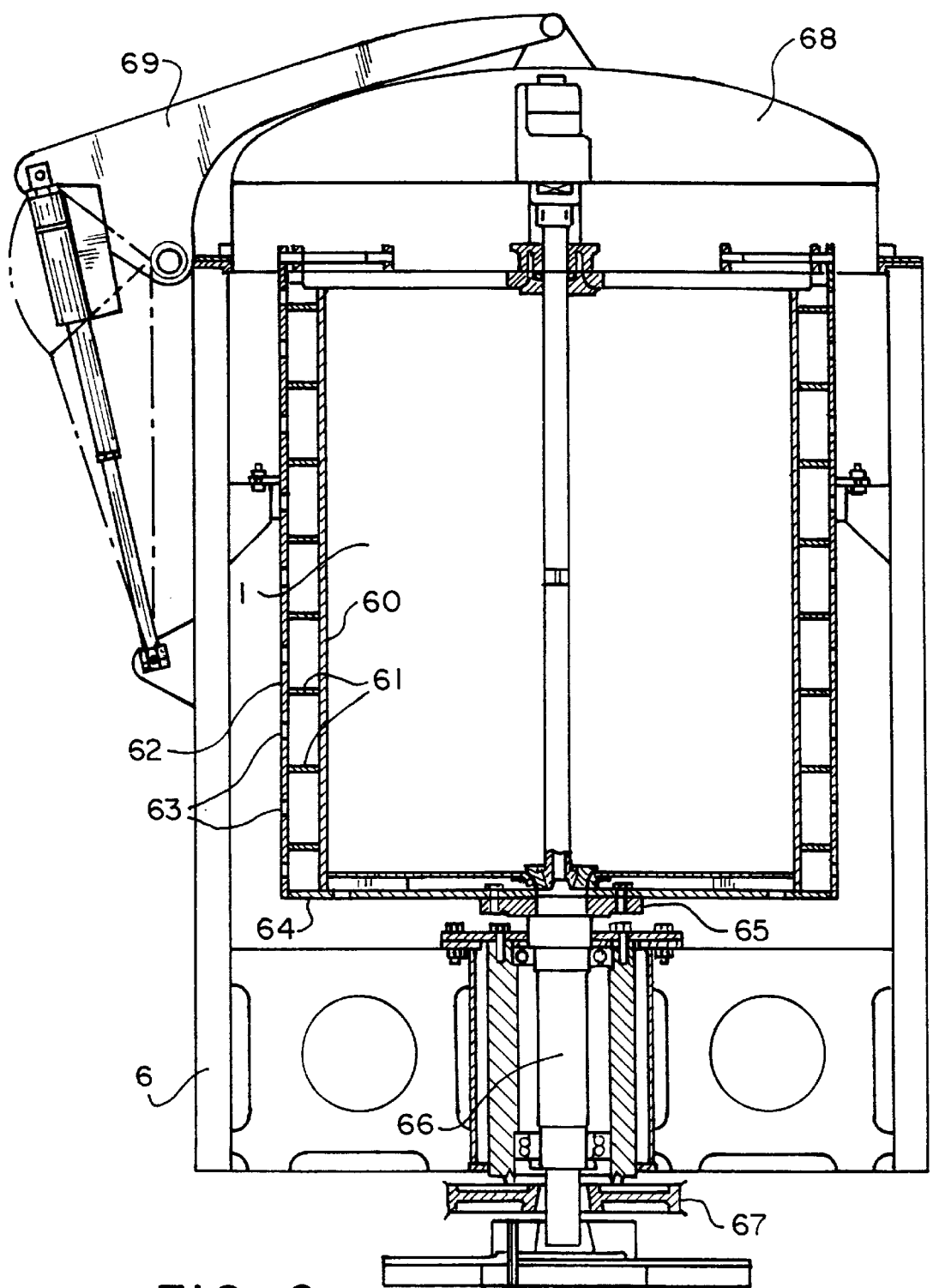
FIG. 6 shows a standing section of a sixth embodiment of the device according to the invention with a replaceable filter element.
Figure 7:
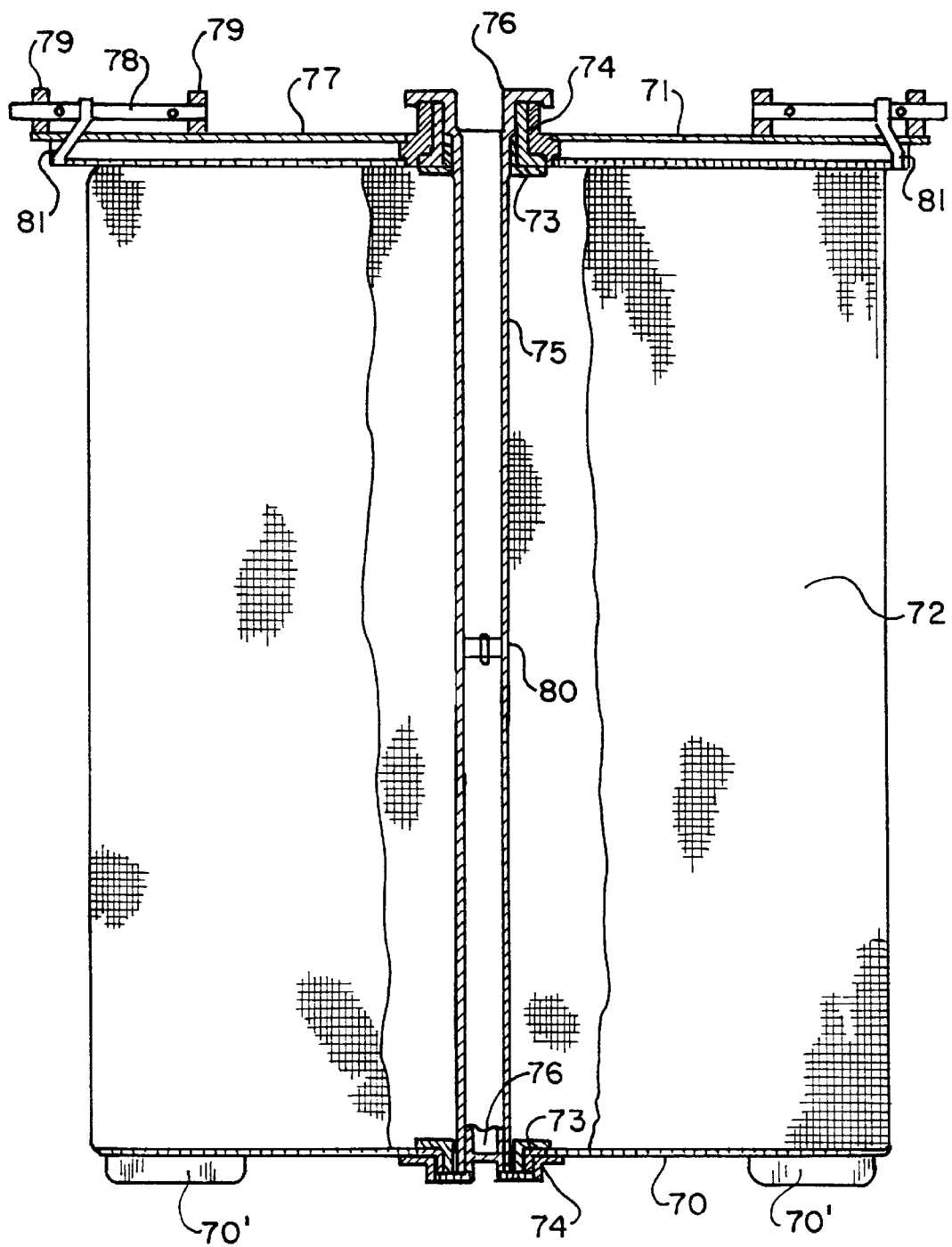
FIG. 7 is a standing section of a filter element of FIG. 6 mounted as insert piece.

FIGS. 6 and 7 show a sixth embodiment wherein the axis of rotation of the drum stands vertically.

Drum 1 consists here of a fine-mesh, perforated inner wall 60 around which an outer wall 62 with passage openings 63 is arranged by means of spacer rings 61. The inner and outer walls are supported by a base 64 which is fixed via a fixing member, for instance screw bolts, to a rotatably driven flange 65. The latter is fixed to a shaft 66 which is embodied at the bottom end with a drive wheel or V-belt pulley 67 for causing the shaft 66 to rotate. Drum 1 is held in housing 6 which is closable by means of a cover 68. The cover 68 can be placed liquid-tight and if necessary gas-tight on the upper edge of the housing on the container 6 respectively lifted therefrom by means of a fastening mechanism 69 which requires no further explanation.

The filter element consists here of a filter bag element for placing in the rotating drum 1 which can be constructed as an insert piece from the elements further elucidated with reference to FIG. 7.

It is noted that the filter bag is manufactured from a foldable material, for example a web of natural or plastic thread or other material, for instance non-woven material. The filter bag covers the entire inner wall of the inner wall 60 in addition to the top and bottom faces of drum 1, so that the filtering action can take place along the whole outer periphery of the filter bag and, particularly in accordance with the principle of the invention, along the radially extending top and bottom faces thereof.

It will be apparent that with such a foldable material the filter bag is difficult to place and fix in the drum and also that a reliable seal between injection pipe and rotating filter housing must be realized, wherein during removal the bag can be grasped, so that the bag must be form-retaining, and for this purpose the invention has proposed to first form the filter bag to insert piece, which is further elucidated in FIG. 7.

The insert piece consists of a perforated bottom plate 70 with spacer ribs 70' which are evenly distributed along the periphery. A top plate 71 is further arranged at a distance from bottom plate 70 by means of a central shaft, which is further explained below. Filter bag 72 consists of a cylindrical wall part in addition to a top wall corresponding with the underside of top plate 71 and a bottom wall corresponding with the upper side of bottom plate 70.

The top and bottom wall of the bag 72 are provided with a central hole which is fixedly clamped on the edge between an inner flange 73 and an outer flange 74 at the top and bottom respectively, wherein it is remarked that an the outer flange 74 also fixedly clamps the bottom plate 70.

A central shaft in the form of a pipe 75 which is closed off at the bottom by a plug 76' and embodied at the top with an outward pointing flange 76 is subsequently inserted through flanges 73 and 74 into the lower flange 74. This insertion continues until the upper flange 76 comes up against the upper edge of the outer flange 74, whereby the distance between top plate 71 and bottom plate 70 is defined as well as the distance between the top and bottom walls of the bag 72.

This above described unit can subsequently be placed in drum 1, but not before a cover 77 has first been arranged round the neck of flange 73.

This cover 77 is embodied at three or more positions with a locking pin 78 which is slidable in axial sense in eyelets 79 arranged on cover 77.

During assembly in the drum 1 the bottom plate 70 will come to rest with the spacer ribs 70' on the base 64 so that plate 70 remains at a distance from base 64. The top plate 71 comes to rest with the peripheral edge on the perforated inner wall 60 of the drum, wherein the cover 77 connects close-fittingly onto the inner side of the outer wall 62 of drum 1. Cover 77 can be locked against the drum wall 1 by means of the pins 78 and a closed container results.

The device operates as follows:

The liquid for filtering is fed via the central pipe 75 and flows out through an outlet opening 80 in this pipe about halfway along the height thereof. Up to this moment the machine functions as a filter centrifuge. The liquid enters the space in the filter bag, whereby a filtering will take place initially through the cylindrical wall 72 of the bag by means of the centrifugal action. The liquid flows outward via the perforated wall 60 and enters the container 6 via the passage openings 63.

The deposit left behind on the inside of the filter bag 72 clogs this bag, whereby the further filtration takes place initially by a separation as a consequence of the centrifugal force due to the rotation of the drum, and the cleaned liquid will then be filtered off afterwards through the upper and underside of filter bag 72 and flow out via the perforated top and bottom plates 70 and 71 and be flung outward via the space between the inner and outer walls 60, 62 of the drum and the passage openings 63. Thus achieved is the principle of filtering according to the invention that is consistent with the other embodiments.

It is noted that in order to simplify mounting of the insert piece the top plate 71 can be divided into two or more parts which together form a closed plate 71.

It is further noted that the material of the filter bag 72 can be embodied on the upper side with loops 81 which can be suspended from the pins 78.

These loops 81 can also be used to enable transporting of a used filter bag 72 after it has been wholly released from the relevant elements for forming the insert piece, wherein in filled state the bag can attain a weight of 200 kg of filter material. The bag itself can thereafter be used as transporting means.

It is also noted that the wall of the filter bag 72 can be embodied as a double wall in which particular substances can be arranged which bond the filtered material or with which the filtered material forms a chemical compound.

The invention is not limited to the above described embodiments. It is for instance possible to replace the spacer plates 70 and 71 in the insert piece by other means, for instance spoke-like, foldable stiffeners which can be inserted into the filter bag and folded out to give the filter bag the desired cylindrical shape.

I claim:

1. A device for separating at least one component from a fluid, the device comprising:

a closed carrier drum having a fluid inlet and a fluid outlet;

a filter element positioned in the carrier drum, the filter element having a top face and a bottom face and a cylindrical wall extending therebetween; and a fluid duct positioned between the top and bottom faces of the filter element along a longitudinal axis of the filter element, wherein:

the longitudinal axis of the filter element is positioned coaxially with a longitudinal axis of the carrier drum; and the filter element and the carrier drum are rotatable about their coaxially positioned longitudinal axes.

2. The device as claimed in claim 1, wherein the coaxially positioned longitudinal axes of the carrier drum and the filter element are oriented one of vertically and horizontally.

3. The device as claimed in claim 1, wherein the filter element includes transporting means for transporting the filter element having filter material therein.

4. The filter device as claimed in claim 3, wherein the transporting means includes at least one loop positioned one of on and adjacent the top face of the filter element.

5. The device as claimed in claim 1, wherein the wall of the filter element is double-walled and is provided with an additive suitable for bonding or adhesion of the deposited residue.

6. The device as claimed in claim 1, wherein:

the fluid inlet of the carrier drum is alignable with the fluid duct of the filter element adjacent the upper face of the filter element;

the fluid duct includes an opening therein between the upper and lower faces of the filter element; and the fluid duct includes a plug therein positioned between the bottom face of the filter element and the opening in the fluid duct.

7. A device for separating at least one component from a fluid, the device comprising:

a closed carrier drum having a fluid inlet and a fluid outlet;

a filter element positioned in the carrier drum, the filter element having a top face and a bottom face and a cylindrical wall extending therebetween;

a fluid duct positioned between the top and bottom faces of the filter element along a longitudinal axis of the filter element;

at least one spacer rib positioned between the bottom face of the filter element and an end of the carrier drum;

a pair of flanges, one flange positioned between the fluid duct and the top face of the filter element, the other flange positioned between the fluid duct and the bottom face of the filter element; and a cover positioned outside of the filter element around a neck of the flange adjacent the top face of the filter element, wherein:

the longitudinal axis of the filter element is positioned coaxially with a longitudinal axis of the carrier drum;

the filter element and the carrier drum are rotatable about their coaxially positioned longitudinal axes; and the spacer rib, the pair of flanges, the cover and the filter element form an insert that is receivable in the carrier drum.

* * * * *